(12) United States Patent
Kao

(10) Patent No.: US 8,214,832 B2
(45) Date of Patent: Jul. 3, 2012

(54) TECHNIQUES FOR IMPLEMENTING SEPARATION OF DUTIES USING PRIME NUMBERS

(75) Inventor: I-Lung Kao, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1308 days.

(21) Appl. No.: 11/857,471

(22) Filed: Sep. 19, 2007

(65) Prior Publication Data

US 2009/0077555 A1    Mar. 19, 2009

(51) Int. Cl.
    *G06F 9/46* (2006.01)
(52) U.S. Cl. ................................. 718/101; 718/106
(58) Field of Classification Search .................. None
    See application file for complete search history.

(56) References Cited

U.S. PATENT DOCUMENTS

| | | | |
|---|---|---|---|
| 5,068,778 A | 11/1991 | Kosem et al. | |
| 5,357,632 A | 10/1994 | Pian et al. | |
| 5,534,855 A | 7/1996 | Shockley et al. | |
| 6,240,358 B1 | 5/2001 | Kawai | |
| 6,601,233 B1 | 7/2003 | Underwood | |
| 6,816,829 B1 | 11/2004 | Clark et al. | |
| 6,898,790 B1 | 5/2005 | Cheong et al. | |
| 6,986,139 B1 * | 1/2006 | Kubo | 718/105 |
| 7,111,299 B2 | 9/2006 | Tran et al. | |
| 7,155,720 B2 | 12/2006 | Casati et al. | |
| 2005/0138181 A1 * | 6/2005 | Gallet et al. | 709/228 |
| 2006/0069602 A1 | 3/2006 | Messer et al. | |
| 2006/0095914 A1 | 5/2006 | Mankovski | |

FOREIGN PATENT DOCUMENTS

JP    2005-031914    2/2005

OTHER PUBLICATIONS

Hung, Patrick C. K. "From Conflict of Interest to Separation of Duties in WS-Policy for Web Services Matchmaking Process"; Proceedings of 37th Annual Hawaii International Conf. on System Sciences, 2004, (IEEE) pp. 1-10.

* cited by examiner

*Primary Examiner* — Camquy Truong
(74) *Attorney, Agent, or Firm* — Yudell Isidore Ng Russell PLLC

(57) ABSTRACT

A technique for implementing separation of duties for transactions includes determining a current task assignment number of an entity. The technique also includes determining whether the entity can perform a new task based upon the current task assignment number and a task transaction number (which is based on at least one prime number) assigned to the new task.

16 Claims, 4 Drawing Sheets

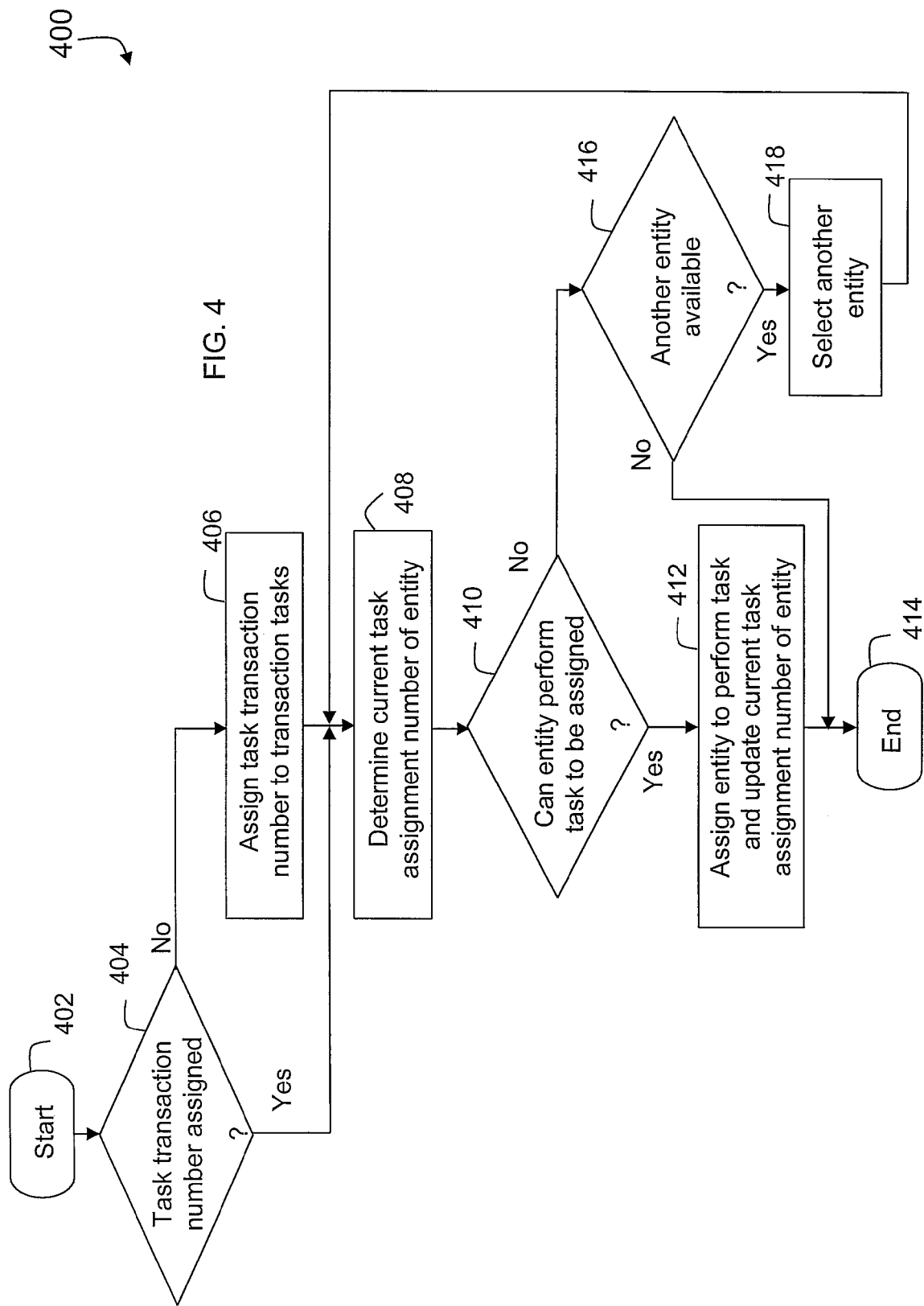

TECHNIQUES FOR IMPLEMENTING SEPARATION OF DUTIES USING PRIME NUMBERS

BACKGROUND

1. Field

This disclosure relates generally to separation of duties and, more specifically to techniques for implementing separation of duties using prime numbers.

2. Related Art

Today, security policies of many transactions, e.g., business transactions, require the enforcement of separation of duties (SOD), which in a basic form dictates that multiple tasks contained in a sensitive transaction each be performed by different entities. The main concept of SOD is to distribute the responsibility for a transaction among several different entities such that no single entity controls two or more tasks of the transaction. In this manner, collusion of two or more entities is required to commit deliberate fraud with respect to a transaction. As one example, SOD is employed in handling bank safe deposit boxes in that a bank has required use of two distinct keys to gain access to a safe deposit box. In this case, a first distinct key is maintained by a bank employee and a second distinct key is maintained by a bank customer that has rented the safe deposit box.

As another example, it is common for a company, e.g., a financial institution, to implement policies that prohibit a single employee from preparing and authorizing a check, e.g., an electronic check. In this case, a first employee (e.g., an accounts payable clerk) may prepare the check and a second employee (e.g., a manager) may authorize the check. While SOD is desirable in combating fraud in various transactions, there is no known efficient approach to implement SOD in computer systems that execute transactions. A typical SOD approach has tracked transaction tasks and the entities to which the tasks have been assigned. With this approach, when an entity has tried to perform a task associated with a transaction, a computer system has checked whether the entity has performed other tasks associated with the same transaction. If the entity has not performed other tasks associated with the transaction, the entity has generally been allowed to perform the task (assuming the entity met other qualifications). After the task was performed, the system has recorded the fact that the entity does not have a right to perform other tasks in the same transaction. From the perspectives of computation, storage, and administration, there is a relatively large amount of overhead to implement SOD using traditional approaches.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 4 is a flowchart of an example process for implementing an SOD application, according to one embodiment of the present disclosure.

DETAILED DESCRIPTION

Figure 1:
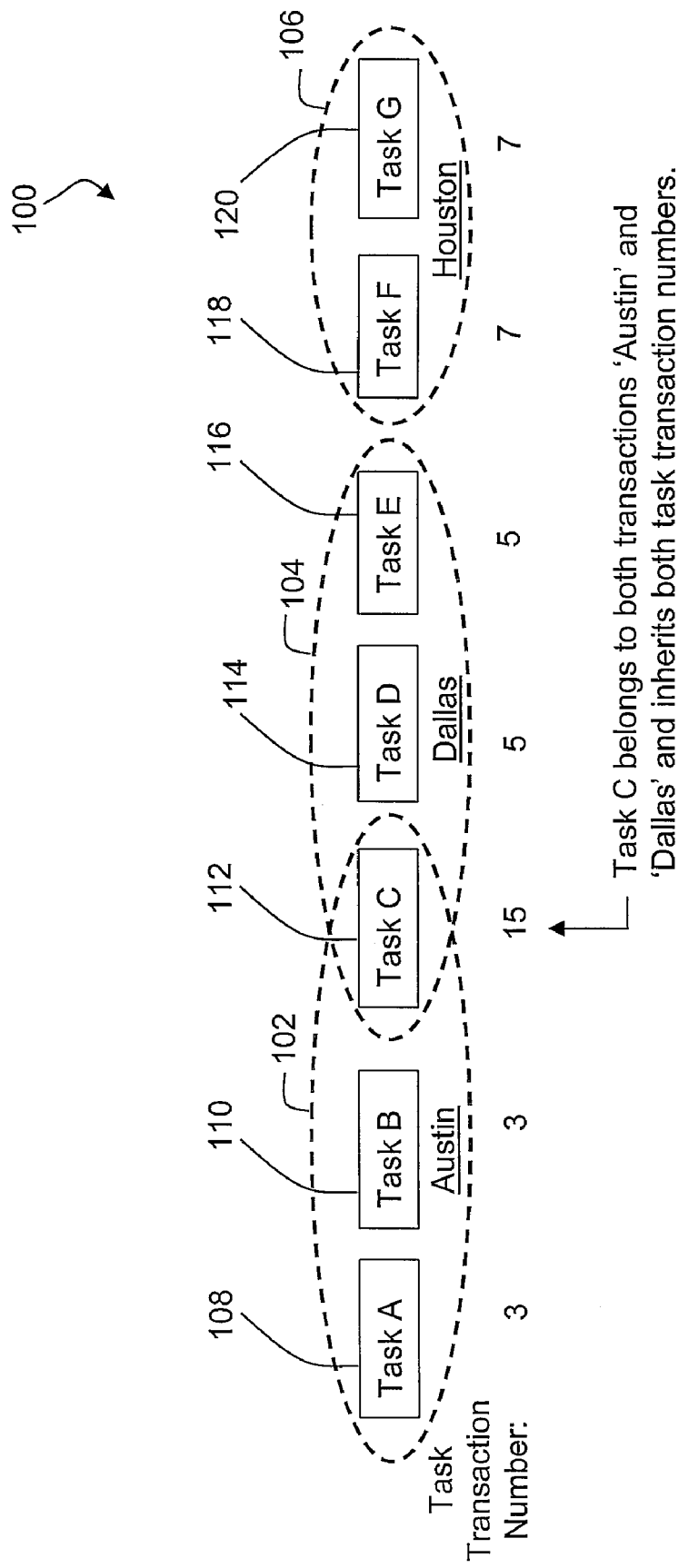
FIG. 1 is a diagram of a number of transactions whose tasks are assigned different transaction numbers, according to various embodiments of the present disclosure.

As will be appreciated by one of ordinary skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, device. More specific examples (a non-exhaustive list) of the computer-readable storage medium would include the following: a portable computer diskette, a hard disk, a random access memory (RAM), a read-only memory (ROM), an erasable programmable read-only memory (EPROM) or Flash memory, a portable compact disc read-only memory (CD-ROM), an optical storage device, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage medium may be any medium that can contain or store the program for use by or in connection with an instruction execution system, apparatus, or device.

Computer program code for carrying out operations of the present invention may be written in an object oriented programming language, such as Java, Smalltalk, C++, etc. However, the computer program code for carrying out operations of the present invention may also be written in conventional procedural programming languages, such as the "C" programming language or similar programming languages. The program code may execute entirely on a single computer, on multiple computers that may be remote from each other, or as a stand-alone software package. When multiple computers are employed, one computer may be connected to another computer through a local area network (LAN) or a wide area network (WAN), or the connection may be, for example, through the Internet using an Internet service provider (ISP).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks.

As used herein, the term "coupled" includes both a direct electrical connection between blocks or components and an indirect electrical connection between blocks or components achieved using intervening blocks or components. As is used herein, the term "entity" includes an individual user or person, an organization (or portion of an organization), or a computer system associated with an individual person or organization (or portion of the organization). As is also used herein, the term "transaction" includes a process, a routine, and a procedure.

According to various aspects of the present disclosure, relatively efficient techniques are employed to implement separation of duties (SOD) transactions, e.g., business transactions. The transactions may be, for example, executed on multiple computer systems. The transactions may include financial transactions or may include approval of requests within an organization (such as travel requests, new equipment requests, etc. that require multi-level approval). In various embodiments, the techniques disclosed herein employ prime numbers to ensure SOD is achieved. Following this approach, each respective transaction is associated with a respective task transaction number (which in various embodiments correspond to a unique prime number) and each task included in a given transaction inherits the respective task transaction number. If a task is included in multiple transactions, the task inherits the respective task transaction numbers from each of the multiple transactions (i.e., the task transaction number of the task included in multiple transactions is a product of all of the inherited task transaction numbers). Each entity is associated with a task assignment number, which is a product of the task transaction numbers of all the tasks that have been assigned to the entity. When an entity attempts to perform a new task, the current task assignment number of the entity is divided by the task transaction number for the new task (or vice versa, depending on which number is larger). If the result of the division is not an integer, the entity is allowed to perform the task and the task assignment number of the entity is then multiplied by the task transaction number associated with the new task to update the task assignment number. If the result of the division is an integer, the entity is not allowed to perform the new task since a previous task associated with the same task transaction number (i.e., within the same transaction) has already been performed by the entity. A queued task may be reassigned from an entity (prior to performance of the task by the entity) by dividing a current task transaction number of the entity by a task transaction number of the queued task.

Compared to traditional approaches, the techniques disclosed herein (which utilize prime numbers) are more efficient to enforce an SOD policy required by a variety of transactions. Storage overhead of the disclosed techniques is relatively low as only a task transaction number associated with each transaction (not every task) and a current task assignment number for each entity is stored. The run-time performance of the disclosed techniques is advantageously increased as only a division operation and a compare operation (integer or not) is used to check whether a new task can be assigned to an entity. In contrast, conventional approaches require traversing an entire record associated with a transaction to determine whether an entity has performed a previous task associated with the transaction. The disclosed technique is generic and can be implemented in virtually any kind of application where implementation of an SOD policy is desirable.

In a typical application of the disclosed techniques, an organization has a number of transactions that require implementation of an SOD policy. Normally, each of the transactions includes multiple tasks and each task is to be performed by a different entity. In a typical scenario, a task may belong to multiple transactions with an SOD policy enforced on a per transaction basis. In this case, no single entity can perform two tasks that belong to the same transaction. According to various embodiments of the present disclosure, transactions are each assigned a unique prime number that corresponds to a task transaction number and each task within one of the transactions inherits the assigned task transaction number. According to one embodiment, if a task belongs to multiple transactions, the task transaction number is a product of the task transaction numbers of all the transactions to which the task belongs.

According to one aspect of the present disclosure, a technique for implementing separation of duties for transactions includes determining a current task assignment number of an entity. The technique also includes determining whether the entity can perform a new task based upon the current task assignment number and a task transaction number (which is based on at least one prime number) assigned to the new task.

According to another aspect of the present disclosure, a computer network includes multiple computer systems and an application server. The multiple computers systems are each assigned to a different entity. Alternatively, multiple entities may utilize the same computer system to perform tasks. The application server is in communication with the multiple computer systems and is configured to determine a current task assignment number for each of the multiple computer systems. The application server is also configured to determine whether each of the multiple computer systems can perform a new task based upon the current task assignment number for each of the multiple computer systems and a task transaction number assigned to the new task. The task transaction number is based on at least one prime number.

According to another embodiment of the present disclosure, a computer-readable storage medium includes first and second code. The first code is configured to determine a current task assignment number of an entity. The second code is configured to determine whether the entity can perform a new task based upon the current task assignment number and a task transaction number (which is based on at least one prime number) assigned to the new task.

With reference to FIG. 1, an example diagram 100 depicts three transactions 102, 104, and 106 that each include multiple tasks and are labeled 'Austin', 'Dallas', and 'Houston', respectively. More specifically, the transaction 102 includes tasks 108, 110, and 112, the transaction 104 includes the task 112 and tasks 114 and 116, and the transaction 106 includes tasks 118 and 120. The tasks 108 and 110 are assigned a first task transaction number (in this case '3'), the tasks 114 and 116 are assigned a second task transaction number (in this case '5') that is different than the first task transaction number, and the tasks 118 and 120 are assigned a third task transaction number (in this case '7') that is different than the first and second task transaction numbers. The task 112 is assigned a fourth task transaction number of '15', which is the product of the first transaction number ('3') and the second transaction number ('5') as the task 112 is located in both the transaction 102 and the transaction 104. It should be appreciated that the first, second, and third task transaction numbers may be assigned a wide variety of different adjacent or non-adjacent prime numbers.

Figure 2:
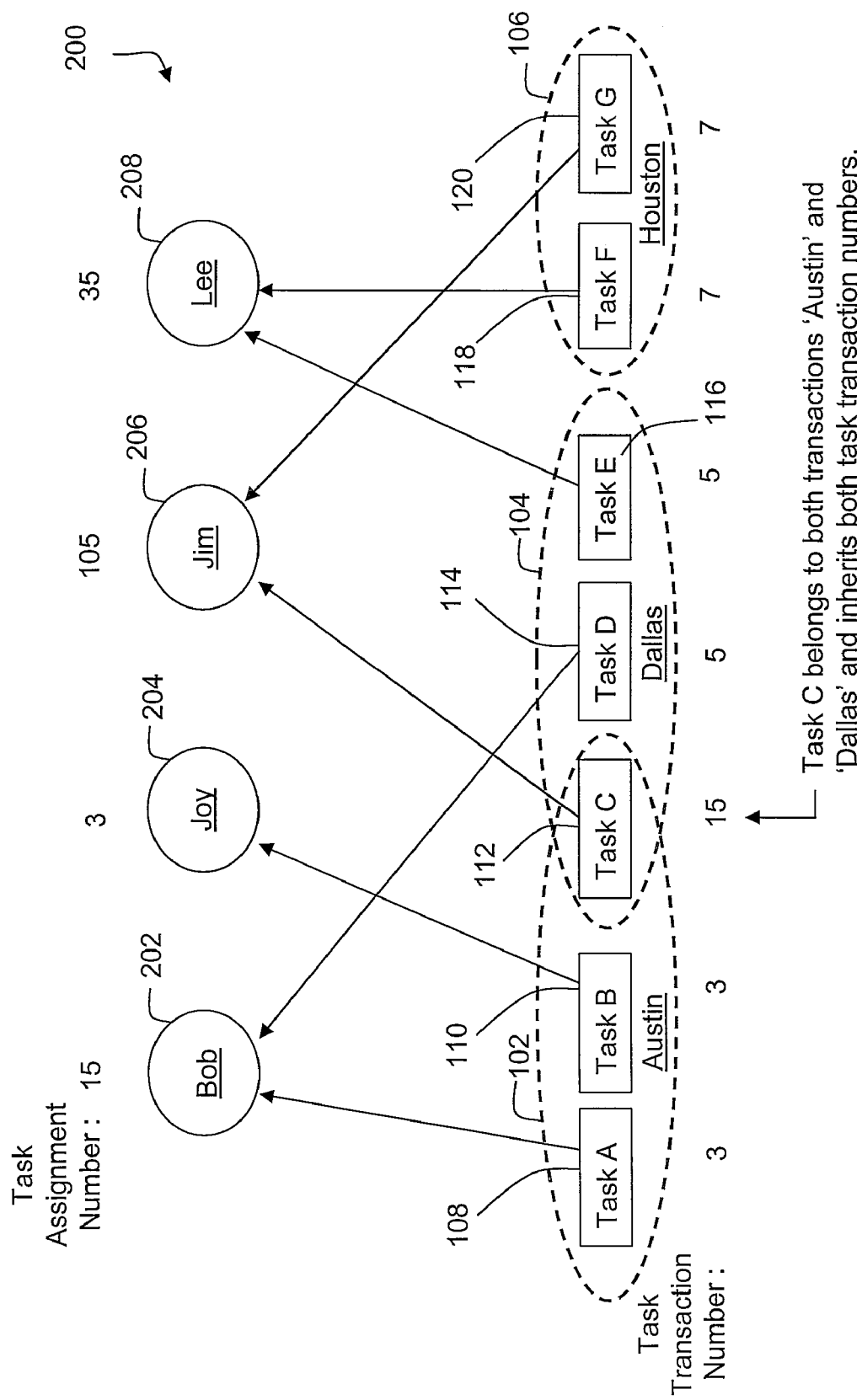
FIG. 2 corresponds to the diagram of FIG. 1 with the addition of entities having associated task assignment numbers that correspond to assigned tasks, according to various embodiments of the present disclosure.

With reference to FIG. 2, an example diagram 200 that shows example task assignments for a number of entities 202, 204, 206, and 208 that are qualified to be assigned a task from one or more of the transactions 102, 104, and 106. In one embodiment, each of the entities 202-208 is initially assigned a task assignment number that has an initial value of '1', prior to the assignment of any tasks to the entities 202-208. It should be appreciated that the initial value may be selected to be different than '1', if desired (assuming the initial value does not correspond to any present or future task transaction number or a multiple of any present or future task transaction number). When one of the entities 202-208 is assigned a new task, a task assignment number of the entity that is assigned the new task is changed to a product of the initial task assignment number of the entity and a task transaction number associated with the new task. For example, if the entity 202 has not been assigned an earlier task, a task assignment number of the entity 202 changes to '3' when the entity 202 is assigned the task 108 (labeled 'Task A') having a task transaction number of '3'. Later, when the entity 202 is assigned the task 114 (labeled 'Task D') having a task transaction number of '5', the task assignment number of the entity 202 changes to '15' (i.e., the product of '3' and '5').

When an entity tries to perform a task (or before a task is assigned to the entity), a current task assignment number of the entity is divided by a task transaction number associated with the task (or vice versa, depending on which number is larger). If the result of the division is an integer, the task cannot be assigned to (or performed by) the entity since another task that belongs to the same transaction was previously assigned to (or performed by) the entity. If the result is not an integer, the task can be assigned to (or performed by) the entity since a task that belongs to the same transaction has not been previously assigned to (or performed by) the entity. After a new task is assigned to (or performed by) an entity, the task assignment number of the entity is multiplied by a task transaction number associated with the new task to provide a current task assignment number for the entity.

In the example diagram 200 of FIG. 2, all of the tasks 108-120 are assigned to the entities 202-208 applying SOD according to the present disclosure. Assuming that the entity 202 (labeled 'Bob') tries to perform the task 110 (labeled 'Task B'), the SOD application will not allow the entity 202 to perform the task 110 in transaction 102, as the task 108 has already been assigned to the entity 202. If the entity 204 (labeled 'Joy') tries to perform the task 114 (labeled 'task D'), the entity 204 is allowed to perform the task 114 since the entity 204 has not previously been assigned any task in the transaction 104. As another example, the entity 208 (labeled 'Lee') has already been assigned the task 116 (labeled 'Task E') and the task 118 (labeled 'Task F') and, as such, is not allowed to perform any other tasks in the transactions 104 and 106. The entity 208 may still, however, perform a task in the transaction 102. It should be noted that the entity 206 (labeled 'Jim') has been assigned a task (i.e., the tasks 112 and 120) in each of the transactions 102, 104, and 106 and is not assigned any other task in the transactions 102, 104, and 106. The entity 206 may be allowed to perform another task in a different transaction (not shown if FIG. 2). When a task is reassigned from an entity (prior to performance of the task by the entity), a task assignment number of the entity is divided by the task transaction number associated with the reassigned task. This allows the entity to be assigned another task within the same transaction (that includes the reassigned task) at a later point in time.

Figure 3:
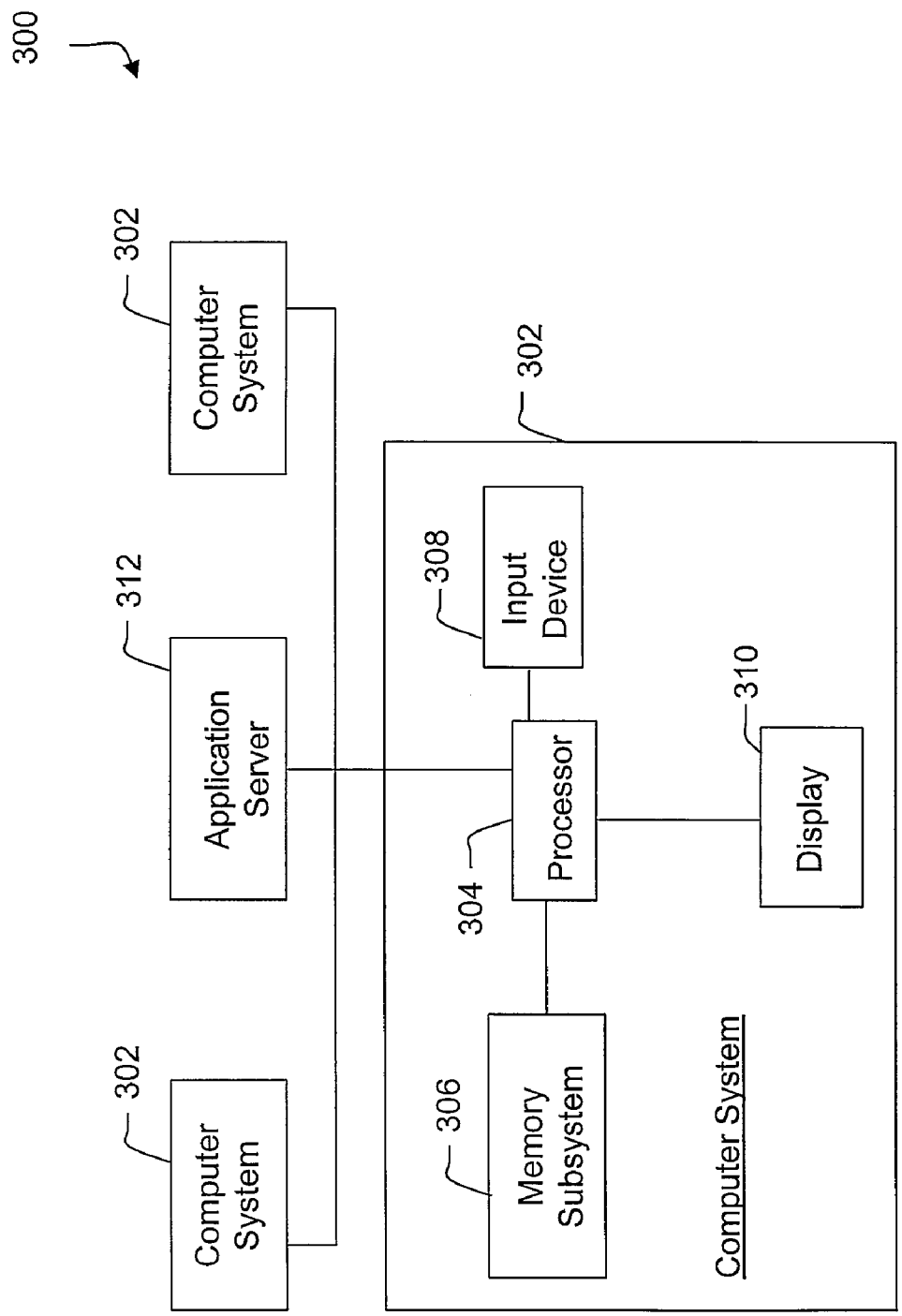
FIG. 3 is a block diagram of an example computer network whose application server implements a separation of duties (SOD) application, configured according to various embodiments of the present disclosure.

With reference to FIG. 3, an example computer network 300 is illustrated that includes a number of computer systems 302 (which are each assigned to a different entity) that are coupled to an application server 312, which executes an SOD application that controls allocation of tasks to the computer systems 302. In this manner, the server 312 performs SOD for one or more secured transactions. The systems 302 may be coupled to the server 312 via an intranet or the Internet (via, for example, an Internet service provider (ISP)). Each of the computer systems 302 includes a processor 304 (including one or more central processing units (CPUs)) that is coupled to a memory subsystem 306 (which includes an application appropriate amount of volatile and non-volatile memory), an input device 308 (e.g., a keyboard and a mouse), and a display 310 (e.g., a cathode ray tube (CRT) or a liquid crystal display (LCD)). The processor 304 of the computer system 302 is in communication with the application server 312 (via, for example, a network interface card (NIC)) and requests and receives task allocations from the server 312, according to various aspects of the present disclosure.

Moving to FIG. 4, an example process 400 for implementing separation of duties (SOD) for transactions is illustrated. The process 400 may be employed as an SOD application that is executing on the server 312 of FIG. 3. In block 402, the process 400 is initiated at which point control transfers to decision block 404. In block 404, the server 312 determines whether a task transaction number has been assigned to a task (to be performed by an entity) associated with a transaction. If a task transaction number has been assigned to the task, control transfers from block 404 to block 408. If a task transaction number has not been assigned to the task, the transaction is a new transaction and control transfers from block 404 to block 406 where a task transaction number is assigned to the new transaction (and tasks within the new transaction). Following block 406, control transfers to block 408.

In block 408, the server 312 determines a current task assignment number of an entity that is to perform the task. Next, in decision block 410, the server 312 determines whether the entity can perform the task to be assigned (i.e., whether the entity has already been assigned (or performed) a task within the transaction) by dividing the current task assignment number of the entity with the with task transaction number of the task and determining whether the result is an integer (i.e., if the result is an integer the task cannot be performed by the entity). If the entity has not already performed a task within the transaction, control transfers from block 410 to block 412, where the server 312 assigns the task to the entity and updates the current task assignment number of the entity. From block 412 control transfers to block 414, where the process 400 returns to a calling routine. If the entity has already performed a task within the transaction, control transfers from block 410 to decision block 416, where the server 312 determines whether another entity is available to perform the task. If another entity is available to perform the task, control transfers from block 416 to block 418 (where another entity is selected) and then to block 408. If another entity is not available to perform the task, control transfers from block 416 to block 414.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. For example, the present techniques can be implemented in any kind of computer system or business transaction application where enforcement of a separation of duties policy is desirable. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of implementing separation of duties for transactions, comprising:
   determining a current task assignment number of an entity; and
   determining whether the entity can perform a new task based upon the current task assignment number and a task transaction number assigned to the new task, wherein the task transaction number is based on at least one prime number, and wherein the determining whether an entity can perform a new task further comprises:
      dividing the current task assignment number of the entity with the task transaction number for the new task to provide a result;
      allowing the entity to perform the new task when the result is not an integer; and
      preventing the entity from performing the new task when the result is an integer.

2. The method of claim 1, wherein the transactions comprise a first transaction that comprises first tasks and a second transaction that comprises second tasks, and wherein the method further comprises:
   assigning a first task transaction number to the first tasks; and
   assigning a second task transaction number to the second tasks, wherein the second task transaction number is different than the first task transaction number and the first and second task transaction numbers are prime numbers.

3. The method of claim 2, further comprising:
   assigning a third task transaction number to a third task that is included within both the first and second transactions, wherein the third task transaction number is equal to the product of the first and second task transaction numbers.

4. The method of claim 3, wherein the third task transaction number is not a prime number.

5. The method of claim 1, wherein the determining a current task assignment number of an entity further comprises:
   calculating a product of assigned task transaction numbers associated with assigned tasks currently assigned to the entity to provide the current task assignment number for the entity.

6. The method of claim 1, further comprising:
   dividing the current task assignment number of the entity with a queued task transaction number that is associated with a queued task that is to be reassigned to another entity to provide an updated task assignment number for the entity; and
   updating the current task assignment number with the updated task assignment number.

7. A computer network for implementing separation of duties for transactions, comprising:
   multiple computers systems each assigned to a different entity; and
   an application server includes one or more processors, that is in communication with the multiple computer systems, wherein the application server is configured to:
   determine a current task assignment number for each of the multiple computer systems;
   determine whether each of the multiple computer systems can perform a new task based upon the current task assignment number for each of the multiple computer systems and a task transaction number assigned to the new task, wherein the task transaction number is based on at least one prime number;
   wherein the application server is further configured to:
   divide the current task assignment number of the first one of the multiple computer systems with the task transaction number for the new task to provide a result;
   allow the first one of the multiple computer systems to perform the new task when the result is not an integer; and
   prevent the first one of the multiple computer systems from performing the new task when the result is an integer.

8. The computer network of claim 7, wherein the transactions comprise a first transaction that comprises first tasks and a second transaction that comprises second tasks, and wherein the application server is further configured to:
  assign a first task transaction number to the first tasks; and
  assign a second task transaction number to the second tasks, wherein the second task transaction number is different than the first task transaction number and the first and second task transaction numbers are prime numbers.

9. The computer network of claim 8, wherein the application server is further configured to:
  assign a third task transaction number to a third task that is included within both the first and second transactions, wherein the third task transaction number is equal to the product of the first and second task transaction numbers and is not a prime number.

10. The computer network of claim 9, wherein the first, second and third task transaction numbers are different.

11. The computer network of claim 7, wherein the application server is further configured to:
  calculate a product of assigned task transaction numbers associated with assigned tasks currently assigned to each of the multiple computer systems.

12. The computer network of claim 7, wherein the application server is further configured to:
  divide the current task assignment number of a first one of the multiple computer systems with a queued task transaction number that is associated with a queued task that is to be reassigned to a second one of the multiple computer systems to provide an updated task assignment number for the first one of the multiple computer systems; and
  update the current task assignment number of the first one of the multiple computer systems with the updated task assignment number.

13. A computer-readable storage medium including computer code for implementing separation of duties for transactions embodied thereon, the computer code comprising:
  first code for determining a current task assignment number of an entity;
  second code for determining whether the entity can perform a new task based upon the current task assignment number and a task transaction number assigned to the new task, wherein the task transaction number is based on at least one prime number, wherein the transactions comprise a first transaction that comprises first tasks and a second transaction that comprises second tasks;
  third code for assigning a first task transaction number to the first tasks;
  fourth code for assigning a second task transaction number to the second tasks, wherein the second task transaction number is different than the first task transaction number; and
  fifth code for assigning a third task transaction number to a third task that is included within both the first and second transactions, wherein the third task transaction number is equal to the product of the first and second task transaction numbers, and wherein the first, second and third task transaction numbers are different
  wherein the new task is associated with one of the first tasks or the second tasks;
  allowing the entity to perform the new task when a result of dividing the current task assignment number with the task transaction number is not an integer.

14. The computer-readable storage medium of claim 13, wherein the first code further comprises:
  sixth code for calculating a product of assigned task transaction numbers associated with assigned tasks currently assigned to the entity.

15. The computer-readable storage medium of claim 13, wherein the second code further comprises:
  seventh code for dividing the current task assignment number of the entity with the task transaction number for the new task to provide a result;
  eighth code for allowing the entity to perform the new task when the result is not an integer; and
  ninth code for preventing the entity from performing the new task when the result is an integer.

16. The computer-readable storage medium of claim 13, wherein the computer code further comprises:
  tenth code for dividing the current task assignment number of the entity with a queued task transaction number that is associated with a queued task that is to be reassigned to another entity to provide an updated task assignment number for the entity; and
  eleventh code for updating the current task assignment number with the updated task assignment number.

* * * * *